United States Patent Office 2,968,572
Patented Jan. 17, 1961

2,968,572
CHEMICAL COMPOSITION AND PROCESS FOR SOIL STABILIZATION

Cletus E. Peeler, Jr., Painesville, Ohio, assignor to Diamond Alkali Company, Cleveland, Ohio, a corporation of Delaware No Drawing. Filed July 21, 1958, Ser. No. 749,631

6 Claims. (Cl. 106—74)

This invention relates to new and improved alkali metal silicate-containing compositions and their use in the solidification or stabilization of soil impregnated therewith. More particularly, the present invention relates to a new and improved method of strengthening soil by chemical treatment.

The use of various chemicals in the treatment of soil as in subsoil applications wherein a porous substrata is to be strengthened and/or rendered fluid impermeable is well-known at this time. In some instances the prior soil treatment techniques have been satisfactory but it has been found that generally all of the prior methods and soil-treating compositions have been subject to one or more problems which heretofore have limited the application of chemical soil treatment.

Prior practice generally has involved the successive injection of two separate liquids, one being an alkali metal silicate solution, such as a sodium silicate solution, the other a gelling liquid, such as calcium chloride reactable with the sodium silicate within the soil therein to form a rigid silica gel and achieve in situ the desired soil stabilization and solidification. However, in using successive injections of the different reactants which heretofore generally have been necessary to avoid premature gelling, it has been found that there frequently occurs an undesired gelation at the immediate site of injection which tends there to plug the soil pores and prevent uniform mixing and reaction of the silicate with the gelling agent. Accordingly, there is obtained in many instances a non-uniform gel structure in the soil with resultant non-gelled sections where stabilization is desired.

Perhaps the most common expedient employed in an effort to avoid the disadvantages of the injection of two reactants has been a deliberate dilution of the silicate and gelling agent, such as calcium chloride, to provide a single dilute solution in which the gelation reaction occurs slowly enough to permit mixing time and to move the mixture into the soil. However, except in those instances where it is desired to employ a dilute solution as hereinafter explained, in addition to the disadvantage of handling large volumes of dilute aqueous mixtures with the resultant increased equipment costs, a perhaps more significant disadvantage of such a procedure is that the strength of the resultant gel is relatively low when reactants in extremely dilute form are employed.

Accordingly, it is the principal object of this invention to avoid the difficulties of the prior art techniques of soil solidification and to provide a new and improved composition adapted for use in soil stabilization.

A further object of this invention is to provide a new and improved alkali metal silicate-containing, gelable composition of controllable water-insolubility and gel time.

These and other objects and advantages of the invention will appear more fully from the following description thereof.

Broadly, the present invention comprises the use of a composition of matter and method of using such a composition comprising an aqueous alkali metal silicate and an amide having the structure $$R-\overset{O}{\underset{}{C}}-NH_2$$

wherein R is selected from the group consisting of hydrogen, lower alkyl groups such as methyl, ethyl, propyl, butyl, isomers thereof or the like, —CONH₂, lower alkyl-CONH₂ groups, wherein the lower alkyl portion is methyl, ethyl, propyl, butyl, isomers thereof, or the like, and water-soluble salts of the foregoing, e.g., alkaline earth metal salts (Ca, Ba and/or Sr) or alkali metal salts and acetates. Specific illustrative amides are formamide (M.P. 2.5° C.) which is preferred, acetamide, propionamide, butyramide, or the like. In some instances, the composition of this invention additionally contains an additive for imparting an initial high degree of water insolubility. Such an additive is described hereinafter in some detail.

As used in the specification and claims, the term "alkali metal silicate" is intended to refer to alkali metal silicates having an alkali metal oxide:silicon dioxide molar ratio within the range from about 1.0:3.0–4.0, notably sodium silicate having an Na₂O:SiO₂ ratio within the range of about 1:3.0–4.0, the preferred Na₂O:SiO₂ ratio being 1Na₂O to about 3–3.5 SiO₂, and the specifically preferred material being an aqueous sodium silicate having an Na₂O:SiO₂ ratio of about 1Na₂O:3.3SiO₂ or 1Na₂O:3.22 SiO₂. The term "alkali metal" as used in the specification and claims is intended to refer to the various alkali metals, i.e., sodium, potassium, lithium, rubidium, cesium and mixtures thereof. Silicates of potassium and sodium are more generally available. Because of their lower cost and availability, sodium silicates are more widely used and, therefore, are preferred in the practice of the present invention and particular reference hereinafter is made to such silicates.

While the invention is especially concerned with compositions of an amide and silicate which are highly satisfactory in many applications, the present invention also comprises compositions which additionally contain a reactive salt capable of reacting with the alkali metal silicate rapidly to form with the silicate a completely or substantially water-insoluble gel. When no such reactive salt is employed, the advantages of this invention are achieved but in some instances, using a relatively low concentration of amide, the silica gel initialy formed is slowly soluble in water. Such gels become water-insoluble in a fairly short time even without the addition of a reactive salt. However, it will be appreciated that in some applications, for example, in the treatment of soil at a depth below the existing water level, the ground moisture present could be disadvantageous in dissolving the initially-formed amide-silicate gel. Accordingly, in such a situation it is a preferred practice of this invention that the silicate-amide composition employed additionally contain a reactive salt for the sole purpose of providing a high degree of initial water-insolubility in the initial gel formed from the three component, i.e., amide-silicate-reactive salt composition.

Generally, the process of this invention comprises contacting soil to be treated with a composition consisting essentially of a single liquid mixture comprising an aqueous alkali metal silicate, an amide as previously defined and, if desired, a reactive salt, generally added in the form of an aqueous solution. The amide and silicate can be so proportioned as to provide a reaction or gelling time of about ½ to 8 hours at temperatures generally from 32° F. to about 180° F. No reactive salt need be employed unless a high degree of initial gel water insolubility is necessary. In any event, there is provided an easily handled readily pumpable liquid singularly adapted for soil treatment, especially subsoil injection, where it can be used as a soil impregnant uniformly flowing in the soil to an extent dictated by pressure applied, soil porosity and permeability. The undesired premature gelling of prior single treatment solutions, i.e., so-called "one-shot" treatments and the low strength of gels formed from prior highly diluted reactants is avoided while there is achieved a rigid gel of high strength and fluid impermeability.

In the discussion of the invention thus far it will be understood that the composition of this invention incorporates at least sufficient water to render the composition fluid. However, except in those instances where a dilute solution is desired for reasons of economy or as hereinafter indicated, substantial dilution is to be avoided since it is not necessary as it was in the prior art practice in order to prevent undesired premature gelling and since the presence of a high proportion of water represents an added burden to the equipment. Generally, at least a portion of the necessary water may advantageously be incorporated by using a commercial aqueous alkali metal silicate, typically of alkali metal oxide-$SiO_2$ solids content of about 35 to 45%, with additional water being added, if desired, as by admixture of the water with the amide and/or any reactive salt which may be employed.

The term "reactive salt" as used in the specification and claims is intended to mean those metal salts which chemically react with aqueous alkali metal silicate to produce a completely or substantially water-insoluble silica gel.

It will be appreciated that the proportions of amide, silicate, added water and reactive salt, as well as the amount of soil treated with a given quantity of such a composition varies widely depending upon the porosity, permeability and type of soil, nature of substrata if subsoil applications are intended, and the like. Accordingly, it generally is not feasible to define in terms of proportions a composition which represents an optimum material for use in all types of soil solidification and/or stabilization operations.

However, in many instances it has been found that for practical purposes, using a commercial aqueous alkali silicate, e.g., sodium silicate, typically containing about 35 to 45% solids, excellent results are obtained when there is combined with about 25% to 98% by volume of the total mixture of such an aqueous silicate about 2 to 30% by volume of the total mixture of an amide previously defined herein, especially about 2 to 30% by volume of formamide, the balance being water which may be present in an amount of 0 to 6 times the volume of aqueous commercial silicate used. When a reactive salt is incorporated as an aqueous solution, its concentration should be within the range from about 25 g.p.l. to saturation; the amount of such a solution used should be within the range from 0 to 100% by volume of the commercial aqueous silicate plus any added water.

It is a feature of this invention that in many instances commercial aqueous silicates can be used in undiluted form with undiluted liquid, or saturated aqueous solutions of normally solid, amides. At times, however, generally at temperatures less than room temperature or when it is desired to treat a large volume of soil to prevent waterflow therethrough, it is desirable to increase the water content of the mixture somewhat as, for example, using one volume of commercial aqueous sodium silicate, containing 35 to 45% solids, with up to 6 volumes of water. However, water addition is not essential, especially at temperatures greater than room temperature and when a high strength gel is required, it is better to add little, if any, water to the aqueous commercial silicate.

The amount of reactive salt, when used, is insufficient if used alone with the silicate, to form a satisfactory gel. As indicated hereinbefore, in general, the amount of reactive salt, typically added as an aqueous solution, preferably comprises about 5 to 25% by volume of the total composition. For example, advantageous results are obtained using about 5 to 25% by volume of an aqueous solution containing about 75 g.p.l. of sodium aluminate or 5% by volume of a 50 g.p.l. by weight solution of calcium chloride.

In order that those skilled in the art may more completely understand the present invention and the preferred methods by which the same may be carried into effect, the following specific examples are offered:

Example 1

There is prepared a mixture of sodium silicate, 62.5% by volume (1$Na_2O$:3.3$SiO_2$ average solids 37.3% by weight, specific gravity 1.381–1.397) and formamide, the resultant mixture having a gel time of 45 minutes. This type of silicate-formamide mixture wherein the formamide constitutes about 15.6% by volume of the aqueous silicate, the balance being water, is incorporated into a sand cylinder 1$\frac{31}{32}$" by 2" high (50% porosity). The thus-treated sand cylinder is allowed to stand for six days in air at which time it has an unconfined compressive strength of 787 lbs. per square inch.

Example 2

To 50 ml. of sodium silicate 1$Na_2O$:3.3$SiO_2$, 41° Bé. at 20° C. and 37.98% total solids, is added 20 ml. of distilled water and 10 ml. of formamide with continued stirring. The resultant liquid is clear and exhibits no immediate increase in viscosity. 20 hours after mixing, the liquid silicate-formamide mixture has changed to a hard, tough solid.

Example 3

To illustrate the effect of amide concentration on gel time, formamide and water are premixed in varying proportions and added to undiluted aqueous sodium silicate 1$Na_2O$:3.3$SiO_2$ (41° Bé. to 20° C.—total solids of 37.98% by weight), the solution temperature being maintained at 25° C. The results are as follows:

| Silicate, Ml. | Formamide, Ml. | Water, Ml. | Time to Gel (hours) |
| --- | --- | --- | --- |
| 50 | 2 | 28 | >27. |
| 50 | 4 | 26 | 11. |
| 50 | 6 | 24 | 6. |
| 50 | 8 | 22 | 4. |
| 50 | 10 | 20 | 2 and 10 min. |
| 50 | 12 | 18 | 1. |
| 50 | 14 | 16 | 2 minutes. |

Example 4

Into a split plastic mold is placed 250 g. of −60 mesh dry Ottawa silica sand. 50 ml. of a mixture comprising 100 ml. of undiluted sodium silicate solution of the preceding example, 25 ml. of formamide and 35 ml. of water is prepared and poured into the sand mold. Gelation occurs in 45 minutes.

Example 5

Silicate-amide gels are prepared by adding water to formamide to form 30 ml. of solution which is then mixed into 50 ml. of aqueous sodium silicate (1$Na_2O$:3.3$SiO_2$, 41° Bé. @ 22° C.) and the gel time observed. The results of such tests when the gel temperature is held at 26° C. are as follows:

| Silicate, Ml. | Formamide, Ml. | Water, Ml. | Gel Time, Minutes |
| --- | --- | --- | --- |
| 50 | 12 | 18 | 55 |
| 50 | 13 | 17 | 39 |
| 50 | 14 | 16 | 25 |
| 50 | 10 | 20 | 110 |
| 50 | 8 | 22 | 175 |
| 50 | 6 | 24 | 300 |
| 50 | 4 | 26 | 660 |
| 50 | 2 | 28 | 2040 |
| 50 | 8 | 22 | 180 |
| 50 | 6 | 24 | 300 |
| 50 | 16 | 14 | 4 |

Example 6

There is prepared a composition of this invention consisting of 100 ml. of aqueous sodium silicate (1Na$_2$O:3.22SiO$_2$, 41.5° Bé. @ 20° C.) (62.5% by volume), 40 ml. of water (25.0% by volume) and 20 ml. of formamide (12.5% by volume). The increase in viscosity observed while maintaining the mixture temperature at 28° C. using a Brookfield Viscosimeter with continuous agitation is as follows, the viscosity being expressed in terms of centipoise:

| Age of mixture (minutes): | Viscosity (centipoise) |
|---|---|
| 0 | 14 |
| 10 | 17 |
| 20 | 20 |
| 30 | 22 |
| 50 | 23 |
| 60 | 24 |
| 73 | 39 |
| 80 | 121 |
| 82 | 140 |
| 83 | 307 |
| 84 | 498 |
| 86 | 6320 |

Example 7

To illustrate the effect of varying proportions of amide, a series of tests is carried out with the aqueous sodium silicate of the preceding example, formamide and water are prepared. The results of such tests are indexed comparatively as follows:

| Silicate, Ml. | Formamide, Ml. | Water, Ml. | Gel Time, Minutes |
|---|---|---|---|
| 50 | 2 | 28 | 300 |
| 50 | 4 | 26 | 89 |
| 50 | 6 | 24 | 84 |
| 50 | 8 | 22 | 52 |
| 50 | 10 | 20 | 30 |
| 50 | 12 | 18 | 16 |
| 50 | 14 | 16 | 6 |

Example 8

To illustrate the advantageous insolubilizing effect in certain instances of incorporating a reactive salt with the silicate-amide composition, there is prepared a mixture of 50 ml. of aqueous sodium silicate (1Na$_2$O:3.3SiO$_2$, 40.0°–41.2° Bé.—37.3% solids), 5 ml. of formamide and 24 ml. of water. This mixture, which gels in six hours, is split into two portions; one being placed in distilled water where it softens and dissolves, the other sample, placed in an aqueous solution containing 500 p.p.m. of calcium chloride and sodium chloride combined hardens and remains insoluble. This solution is typical of ground water frequently occurring in practical application of soil stabilization materials.

Example 9

Two sand cylinders are prepared by mixing 250 g. of −60 mesh silica sand with 50 ml. of a solution prepared by mixing 100 ml. undiluted aqueous sodium silicate (1Na$_2$O:3.3SiO$_2$, specific gravity 1.381–1.397), 25 ml. formamide and 35 ml. of water and pouring the 50 ml. of this solution into the sand while it is retained in a mold. The thus-formed sand cylinders are air dried for three days, one cylinder being retained as a standard sample and the other being placed in a beaker of water and allowed to stand in contact with water for a month and a half. No solubility is noted in the immersed cylinder after seven weeks immersion, thus indicating that the gel produced by combining only an alkali metal silicate and an amide achieves a high degree of insolubility.

Example 10

A cylinder of sand (−60 mesh Ottawa silica sand) is prepared using a mixture of 8 ml. (6% by volume) formamide, 60 ml. of sodium aluminate (75 g.p.l., 15% by volume), 92 ml. of water (19% by volume), 120 ml. of aqueous sodium silicate (1Na$_2$O:3.22SiO$_2$, 40.0°–41.5° Bé.), 120 ml. of water being added to the silicate, and maintaining the mixture temperature at 29° C. The mixture is then poured into a mold and the sand added. To fill the mold (9.132 cu. in.) there are employed 254 g. of sand and 50 ml. of the gellable mixture.

Example 11

Test cylinders (1 3/32" dia. x 3" high) of sand are prepared using −60 mesh Ottawa silica sand, the compositions and strengths being as follows:

| Composition of Gelable Liquid, Percent by volume | | | | Sand (g.) | Liq. (ml.) | Compressive strength (p.s.i.) |
|---|---|---|---|---|---|---|
| Formamide | Sodium Aluminate, 75 g.p.l. | Water, Ml. | Sodium Silicate [1] | | | |
| 2 | 15 | 23 | 60 | 252 | 58 | 43.7 |
| 2 | 20 | 18 | 60 | 260 | 50 | 39.4 |
| 8 | 10 | 22 | 60 | 260 | 50 | 51.6 |
| 4 | 10 | 26 | 60 | 260 | 50 | 52.9 |
| 14 | 5 | 21 | [2] 60 | 260 | 50 | 341.7 |
| 15 | 0 | 22.5 | [2] 62.5 | 260 | 50 | 542.7 |

[1] 1Na$_2$O:3.22SiO$_2$, av. 37.5% solids—diluted with equal volume.
[2] Same silicate but undiluted.

Example 12

The following are illustrative of other compositions of this invention:

| Formamide (ml.) | Sod. Aluminate (ml. of 75 g.p.l. soln.) | H$_2$O (ml.) | Silicate [1] (ml.) | Viscosity [1] | | @ T., °C. |
|---|---|---|---|---|---|---|
| | | | | initial | 1 hr. | |
| 24 | 60 | 196 | 120 | 4.2 | >960 | 27 |
| 8 | 60 | 212 | 120 | 4.1 | 4.8 | 29 |
| 32 | 40 | 208 | 120 | 3.7 | 680 | 29 |
| 16 | 40 | 224 | 120 | 4.0 | 4.0 | 29.5 |
| 8 | 80 | 192 | 120 | 4.1 | [2] 768 | 31 |
| 56 | 20 | 204 | 120 | 10.8 | [3] 1,240 | 30 |

[1] In centipoise measured by Brookfield viscosimeter.
[2] At ½ hour.
[3] At 42 minutes.

Example 13

Using an aqueous sodium silicate (1Na$_2$O:3.22SiO$_2$, 40.0°–41.5° Bé., av. solids 37.5%) diluted with an equal volume of water, there are prepared the following compositions having the indicated pumping life and gel times:

| No. | Percent By Volume | | | | Pumping Life (min.) | Gel Time (Minutes) | Wet Compressive Strength (p.s.i.) on sand plug 34% porosity after 7 days |
|---|---|---|---|---|---|---|---|
| | Formamide | Silicate | Water | Sodium Aluminate (75 g.p.l.) | | | |
| 1 | 2 | 60 | 23 | 15 | 60 | 88 | 44 |
| 2 | 2 | 60 | 18 | 20 | 24 | 31 | 39 |
| 3 | 8 | 60 | 22 | 10 | 46.5 | 58 | 52 |
| 4 | 14 | 60 | 21 | 5 | 35 | 42 | 342 |

Example 14

Other illustrative compositions of this invention, wherein the numerical values are in terms of percent by volume, are the following:

| Composition No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Sodium silicate [1] | 60 | 60 | 60 | 60 | 60 | 60 | 60 | 60 | 60 | 60 | 60 | 60 | 60 | 60 | 60 | 60 |
| Formamide | 2 | 2 | 2 | 2 | 2 | 2 | 2 | 2 | 2 | 2 | 2 | 2 | 2 | 2 | 2 | 2 |
| Acetamide | | | | | | | | | | | | | | | | |
| Cyanamid | | | | | | | | | | | | | | | | |
| Propionamide | | | | | | | | | | | | | | | | |
| Butyramide | | | | | | | | | 5 | | | | | | | |
| Sodium aluminate [2] (75 g.p.l.) | 5 | | | | | | | | | 5 | | | | | | |
| Sodium bicarbonate (100 g.p.l.) | | 5 | 5 | | | | | | | | 5 | 5 | | | | |
| FeCl₃ (50 g.p.l.) | | | | 5 | | | | | | | | | 5 | | | |
| AlCl₃ (50 g.p.l.) | | | | | 5 | | | | | | | | | 5 | | |
| CuSO₄·5H₂O (50 g.p.l.) | | | | | | 5 | | | | | | | | | 5 | |
| CuCl₂ (50 g.p.l.) | | | | | | | 5 | | | | | | | | | |
| ZnCl₂ (100 g.p.l.) | | | | | | | | 5 | | | | | | | | |
| CaCl₂ (50 g.p.l.) | | | | | | | | | | | | | | | | 5 |

| Composition No. | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Sodium silicate [1] | 60 | 60 | 60 | 60 | 60 | 60 | 60 | 60 | 60 | 60 | 60 | 60 | 60 | 60 | 60 | 60 |
| Formamide | | | | | | | | | | | | | | | | |
| Acetamide | 2 | 2 | 2 | 2 | 2 | 2 | 2 | 2 | | | | | | | | |
| Cyanamid | | | | | | | | | 2 | 2 | 2 | 2 | 2 | 2 | 2 | 2 |
| Propionamide | | | | | | | | | | | | | | | | |
| Butyramide | | | | | | | | 5 | | | | | | | | |
| Sodium aluminate [2] (75 g.p.l.) | 5 | | | | | | | | 5 | | | | | | | |
| Sodium bicarbonate (100 g.p.l.) | | 5 | | | | | | | | 5 | | | | | | |
| FeCl₃ (50 g.p.l.) | | | 5 | | | | | | | | 5 | | | | | |
| AlCl₃ (50 g.p.l.) | | | | 5 | | | | | | | | 5 | | | | |
| CuSO₄·5H₂O (50 g.p.l.) | | | | | 5 | | | | | | | | 5 | | | |
| CuCl₂ (50 g.p.l.) | | | | | | 5 | | | | | | | | 5 | | |
| ZnCl₂ (100 g.p.l.) | | | | | | | 5 | | | | | | | | 5 | |
| CaCl₂ (50 g.p.l.) | | | | | | | | | | | | | | | | 5 |

| Composition No. | 33 | 34 | 35 | 36 | 37 | 38 | 39 | 40 |
|---|---|---|---|---|---|---|---|---|
| Sodium silicate [1] | 60 | 60 | 60 | 60 | 60 | 60 | 60 | 60 |
| Formamide | | | | | | | | |
| Acetamide | | | | | | | | |
| Cyanamid | | | | | | | | 2 |
| Propionamide | 2 | 2 | 2 | 2 | 2 | 2 | 2 | |
| Butyramide | 5 | | | | | | | |
| Sodium aluminate [2] (75 g.p.l.) | | 5 | | | | | | |
| Sodium bicarbonate (100 g.p.l.) | | | 5 | | | | | |
| FeCl₃ (50 g.p.l.) | | | | 5 | | | | |
| AlCl₃ (50 g.p.l.) | | | | | 5 | | | |
| CuSO₄·5H₂O (50 g.p.l.) | | | | | | 5 | | |
| CuCl₂ (50 g.p.l.) | | | | | | | 5 | |
| ZnCl₂ (100 g.p.l.) | | | | | | | | |
| CaCl₂ (50 g.p.l.) | | | | | | | | 5 |

[1] $1Na_2O:3.3SiO_2$, and alternatively, $1Na_2O:3.22SiO_2$.
[2] As aqueous solution containing 75 g.p.l. sodium aluminate.

NOTE.—Other illustrative compositions of this invention are those as set forth above wherein the amide and/or reactive salt concentration is 15%, 20%, or 30% by volume, the silicate being reduced accordingly.

Example 15

Other illustrative compositions of the invention, wherein the numerical values are in terms of percent by volume, are the following:

| Composition No. | 1 | 2 | 3 |
|---|---|---|---|
| Sodium silicate (41.5° Bé. @ 20° C.) | 62.5 | 60 | 60 |
| Added Water | 25 | 21 | 18.5 |
| Formamide | 12.5 | 14 | 14.0 |
| Sodium aluminate (75 g.p.l. in water) | | 5 | 7.5 |

The term "soil" as used in the specification and claims is intended to refer to various types and compositions of soil, including sand, loam, porous or fissured rock, and the like, for example, as described in pages 614 to 633 of volume 12 of the Kirk-Othmer Encyclopedia of Chemical Technology and on page 785 of Hackh's Chemical Dictionary, third edition.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of treating soil which comprises contacting said soil with a single liquid composition of matter consisting essntially of an aqueous alkali metal silicate having an alkali metal oxide:silicon dioxide ratio of about 1:3.0 to 1:4.0 and containing about 35% to 45% solids, water and about 2% to 30% by volume of an amide of the structure

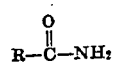

$$R-\overset{O}{\underset{\|}{C}}-NH_2$$

wherein R is selected from the group consisting of H, lower alkyl, —$CONH_2$ and lower alkyl-substituted amido groups.

2. The method according to claim 1 wherein the amide is formamide.

3. The method according to claim 1 wherein the composition also includes about 5% to 25% by volume of the total composition of an aqueous solution containing 50 to 100 grams per liter of a metal salt capable of reacting with the alkali metal silicate to produce a water-insoluble silica gel, said metal salt being a salt of a metal selected from the group consisting of alkali metals, alkaline earth metals, aluminum, iron, copper and zinc.

4. The method according to claim 1 wherein the composition also includes about 5% to 25% by volume of the total composition of an aqueous solution containing about 50 to 100 grams per liter of a reactive salt selected from the group consisting of sodium aluminate, sodium bicarbonate, ferric chloride, aluminum chloride, cupric sulfate, cupric chloride, zinc chloride and calcium chloride.

5. A soil stabilizing composition of matter in the form of a single liquid composition of matter consisting essentially of 25% to 98% by volume of an aqueous sodium silicate having an $Na_2O:SiO_2$ ratio of about 1:3.0 to 1:4.0 and containing about 35% to 45% solids, about 2% to 30% by volume of formamide, and 5% to 25% by volume of an aqueous solution containing 50 to 100 grams per liter of sodium aluminate and the balance water.

6. Soil stabilized by admixture with a composition consisting essentially of an aqueous alkali metal silicate having an alkali metal oxide:silicon dioxide ratio of about 1:3.0 to 1:4.0 and containing about 35% to 45% solids and about 2% to 30% by volume of formamide.

References Cited in the file of this patent

UNITED STATES PATENTS

| | | |
|---|---|---|
| 1,827,238 | Joosten | Oct. 31, 1931 |
| 2,069,486 | Tilden | Feb. 2, 1937 |
| 2,437,387 | Hodgson | Mar. 9, 1948 |
| 2,575,170 | Holmes | Nov. 13, 1951 |
| 2,717,884 | Morrill | Sept. 13, 1955 |
| 2,766,130 | Dietz | Oct. 9, 1956 |
| 2,809,118 | Keil | Oct. 8, 1957 |
| 2,899,330 | Lyons | Aug. 11, 1959 |